United States Patent

[11] 3,622,789

| [72] | Inventor | Victor Volkoviski<br>Paris, France |
| --- | --- | --- |
| [21] | Appl. No. | 887,675 |
| [22] | Filed | Dec. 23, 1969 |
| [45] | Patented | Nov. 23, 1971 |
| [73] | Assignee | Compagnie des Compteurs<br>Paris, France |
| [32] | Priority | Dec. 31, 1968 |
| [33] | | France |
| [31] | | 182,312 |

[54] DEVICE FOR MEASURING THE DISPLACEMENT OF THE IMAGE OF AN OBJECT EMITTING INFRARED RAYS
13 Claims, 3 Drawing Figs.

[52] U.S. Cl. .................................................. 250/83.3 H
[51] Int. Cl. ............................................... G01t 1/16
[50] Field of Search ........................................ 250/83.3 H

[56] References Cited
UNITED STATES PATENTS
| 3,453,432 | 7/1969 | McHenry | 250/83.3 H |
| 3,486,024 | 12/1969 | Astheimer | 250/83.3 H |

*Primary Examiner*—James W. Lawrence
*Assistant Examiner*—Davis L. Willis
*Attorney*—Pierce, Scheffler & Parker ABSTRACT: Device for measuring the displacement of the image of an object emitting infrared rays comprising at least two groups of series-connected thermoelements arranged symmetrically in relation with an origin point of the image of the object.

DEVICE FOR MEASURING THE DISPLACEMENT OF THE IMAGE OF AN OBJECT EMITTING INFRARED RAYS

The present invention relates to a device enabling the measuring of the displacement in its plane of the image of an object emitting infrared rays, for instance, this displacement being evaluated in relation to a point of origin taken on the optical axis of the device.

More precisely, the device gives two signals of continuous or discontinuous variations, representing in rectangular coordinates the displacement of the image to be monitored, in relation to the origin of two reference axes.

Without limiting the scope of the invention, such a device is particularly applicable to the monitoring of attitude of satellites by pointing a land horizon sensor, for instance, at a body emitting infrared rays.

The device, according to the invention, comprises thermoelements whose junctions are positioned in relation to the image of the object presumed to be centered at the point of origin, and it is characterized in that the junctions are distributed in at least two groups arranged symmetrically in relation to said point or origin, aligned along one and the same direction, and electrically connected respectively in series so as to make a thermopile whose electric signal is representative of the displacement of the image according to the direction of its movement.

According to a first embodiment, the junctions are distributed into four groups arranged symmetrically two by two in relation to said point of origin according to two rectangular directions.

According to another embodiment, the junctions are distributed into at least two groups arranged parallel and symmetrically in relation to the point of origin.

The junctions are covered, by groups or individually, with a coating of a substance absorbing the rays so as to create for each position of the image, a particular current distribution corresponding to temperatures along two groups of diametrically opposed junctions.

One shall see by that which follows, that the electromotive force provided by each thermopile is appreciably proportional to the components of the displacement of the image to be measured, according to the two directions under consideration.

It is known that in these conditions, the two signals obtained can be utilized for monitoring two controls tending to bring the center of the image into coincidence with the point of origin taken as a reference, and consequently, the appliance carrying the optical sensor aims at the object emitting the infrared rays.

In the description which follows by way of example, one shall suppose that the object at a finite or infinite distance, is of circular shape, which is the most general case, but the invention can be adapted to objects of other simple geometrical shapes.

To enable the invention to be better understood, one shall describe two particular embodiments by way of nonrestrictive examples, by referring to the attached drawing, in which.

Figure 1:
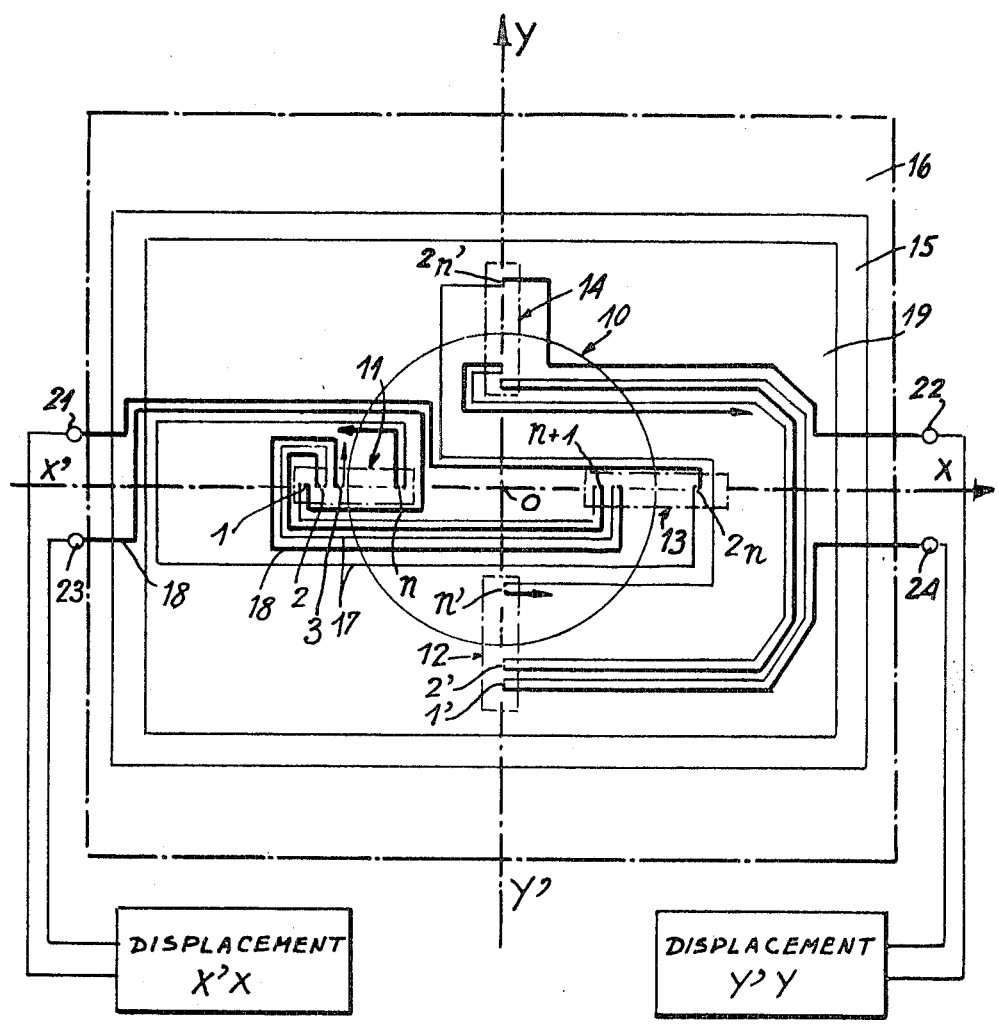
FIG. 1 shows a diagrammatical plane view of a first embodiment of the device according to the invention, providing a continuous variation signal.

In FIG. 1, one supposes that the displacement of the image to be determined is sighted in relation to two coordinated axes, preferably, but not necessarily, rectangular, X'OX and Y'OY, the point 0 being situated on the optical axis of the device. The device is essentially made up by four identical radiation-receiving areas 11 to 14 placed two by two according to the preceding axes. These areas are obtained by deposit under a vacuum on an insulating support plate 15 of very slight thickness, for instance, of mylar, alumina, oxydized aluminum, etc., stretched on a frame 16. The receiving areas are of a lengthened rectangular shape, i.e., with a slight width compared with their length which is chosen equal to the maximum amplitude of the displacement of image to be followed, and they are symmetrically arranged in relation to the origin 0 of the axes, so that when the image 10 of supposedly circular shape has its center in coincidence with the origin 0, its edge passes through the middle of each of the areas 11 to 14 and thus splits them respectively into two equal parts, the one illuminated towards the center thereof, the other not lit up towards the periphery thereof.

The device is place in an enclosure 16 in which it is kept at an even and invariable temperature; this results in a state of heat equilibrium which entails an identical temperature repetition for the four areas. Actually, the difference between the energy received and the energy emitted by the two illuminated parts and unlit ones of the four areas must be compensated for by energy transmitted by the ambient medium. Hence, there is set up an identical temperature distribution for the four areas that one may, as a first approximation, characterize by two different temperature values and respectively invariable for the illuminated part and the unlit one of each area with a discontinuity in the middle of the area.

For any position of the image, when the center of the image does not coincide with the origin 0, this image covers the four areas differently. Nevertheless, the areas being of very slight width in comparison to the diameter of the image, the illuminated part of an area is appreciably equal to the unlit part of the diametrically opposed area on the same axis, and reciprocally. In this case, the distribution of temperature will still keep the same form but the discontinuity of temperature will no longer be in the middle of the area, the edge of the image not passing through the middle of the areas. Thus, to each position of the image, there corresponds a particular distribution of temperature along two diametrically opposed areas.

The difference between the temperature of the illuminated parts and unlit parts of two opposed areas 11, 13 or 12, 14 is measured by two independent thermopiles formed by evaporation under a vacuum on the insulating support 15. The junctions of each thermopile are distributed between the areas 11 and 13 for one, 12 and 14 for the other. Each thermopile is formed by a certain number $n$ of thermoelements arranged in series with the junctions $2n$ so as to be distributed in the two corresponding receiving areas.

In a particular numerical example, each thermopile comprises $n=12$ thermoelements in series, of which the 24 junctions are also distributed between the areas 11 and 13 of the axis X'OX for the first thermopile, and the areas 12 and 14 for the axis Y'OY for the second thermopile. The thermoelements are formed by bismuth conductors 17 (shown by a thin line) and of antimony 18 (shown by a thick line) deposited by evaporation under a vacuum on the insulating plate 15 according to thickness of about 0.2 $\mu$ to 0.8 $\mu$ and a width of about 120 $\mu$. The junctions 1, 2, 3...24 are formed by the covering between them of the two metal conductors over a distance of about 100 $\mu$, these junctions being 0.5 mm. from each other.

The radiant-receiving areas 11 to 14 are rectangular, 6 mm. long and about 1 mm. wide, and carry a deposit of gold black which absorbs radiation. These areas are protected by a deposit 19 of silicon monoxide and in this example are separated by 11.5 mm. The image 10 to be followed then has a diameter of 17.5 mm. The output terminals of each thermopile are respectively designated by 21, 23 and 22, 24.

The putting into series of the thermoelements along each axis is shown in FIG. 1. If one numbers the junctions of each of the thermopiles in the direction X'OX and Y'OY respectively from 1 to $2n$ and 1' to $2n'$:

(1, 2, 3, 4...$k$...$n$ for the area 11;
(
($n+1$, $n+2$...$n+k$...$2n$ for the area 13;
(1', 2', 3', 4'...$k'$...$n'$ for the area 12;
(
($n'+1$, $n'+2$...$n'+k$...$2n'$ for the area 14 the junctions of the n elements in series succeed one another in the following order:

| 1st thermopile | | 2nd thermopile | |
|---|---|---|---|
| 1 | 11 | 1' | |
| n+1 | 13 | n'+1 | 14 |
| 2 | 11 | 2' | 12 |
| n+2 | 13 | n'+2 | 14 |
| . | . | . | . |
| . | . | . | . |
| n | 11 | n' | 12 |
| 2n | 13 | 2n' | 14 |

In these conditions, the two junctions $k$ and $n+k$ of any thermoelement of one and the same thermopile are respectively placed in the two opposite areas and respectively belong to the illuminated and unlit areas or vice versa.

It will be noted that there are the same number of junctions in the illuminated areas of the area 11 (or 12) as in the nonlit areas of the area 13 (or 14) and junctions in the nonlit area 11 (or 12) as in the illuminated area of the area 13 (or 14).

As a first approximation, one may admit that the temperatures of the junctions situated in the illuminated areas of two homologous areas are the same, being $t_1°$ C., and that the temperatures of the junctions situated in the nonlit areas of two homologous areas are also respectively the same, being $t_2°$ C.

The electromotive force of a thermopile can then be calculated by making the algebraic sum of the electromotive forces of all the thermoelements put into series. In supposing that the illuminated area covers the junctions, $m+1$
$m+2$
.....
$n$ where $m$ is comprised between 1 and $n$, then the resultant electromotive force will be:

$E=P(n-m)(t_1-t_2)-Pm(t_1-t_2)=P(n-2m)(t_1-t_2)$ $P$ designating the thermoelectric power of each thermoelement.

The junctions being equidistant and covering the whole length of an area, the electromotive force is thus proportional to the displacement of the image expressed in entire value of the intervals between two successive junctions. It is obvious that this result can be extended to any displacement of the image if the junctions are sufficiently close together, by taking into account the heat conductivity of the material forming the receiving radiant area. Actually, there is set up around the intersection of the edge of the image with an area a continuous temperature field so that the temperature deviation between two successive junctions is sufficiently low. This electromotive force enables one to measure the displacement of the image 10 to be followed knowing the deviation of the thermoelements. Preferably, this electromotive force is utilized after amplifying for displacing a follower device in the focal plane of which said image 10 forms and brings it to such a position that its center coincides with the origin 0 of the axes; at this moment, the electromotive force $E$ is nil. This displacement has been diagrammatized in FIG. 1 by two devices "displacement according to X'X" and "displacement according to Y'Y," respectivement branched to the terminals 21, 23 and 22, 24.

Figure 2:
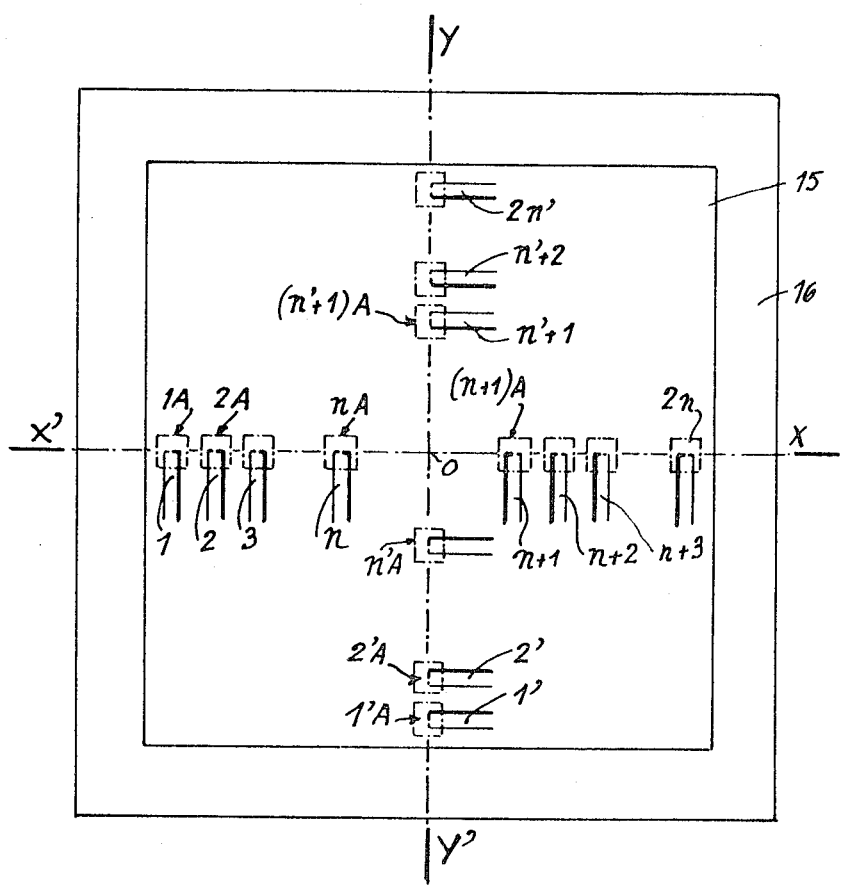
FIG. 2 shows the device modified for supplying a discontinuous variation signal.

In another embodiment shown diagrammatically in FIG. 2, the $n$ junctions of one and the same area are no longer covered by one and the same deposit absorbing the radiations, but each junction 1, 2, 3...$n$, 1', 2', 3'...$n'$ is individually covered with an absorbent layer, forming a succession of small discontinuous areas 1A, 2A...$n$A, 1'A, 2'A...$n'$A, without contact between them. In this case, the electromotive output force of a thermopile no longer varies continuously, but discontinuously by a discontinuous step every time that the image traverses a new junction, this variation of electromotive force being expressed by:

$$\Delta E=2P(t_1-t_2)$$

where $P$ designates the thermoelectric power of each element.

The invention also relates to another embodiment more particularly with a view to reducing space required by the connections joining the various junctions forming the thermopile, and hence, to facilitate operations for depositing on these connections under a vacuum. Also, this enables the sensitiveness of the device to be increased, for one and the same image displacement.

According to this other embodiment, the junctions are distributed over at least two groups arranged parallel and symmetrically in relation to the origin.

A first complementary arrangement consists of distributing the junctions in two groups placed tangentially according to their largest dimension at the external edges of the image of the object, supposedly centered on the origin.

A second complementary arrangement consists of distributing the junctions in four groups placed tangentially according to their smallest dimension at the external edges of the image, supposedly centered on the origin.

In order to appreciate displacement in two directions, preferably perpendicular, one of these two complementary arrangements can be exclusively utilized, or these two arrangements can be combined together or one of them can also be combined with the arrangement also provided in FIG. 1.

Figure 3:
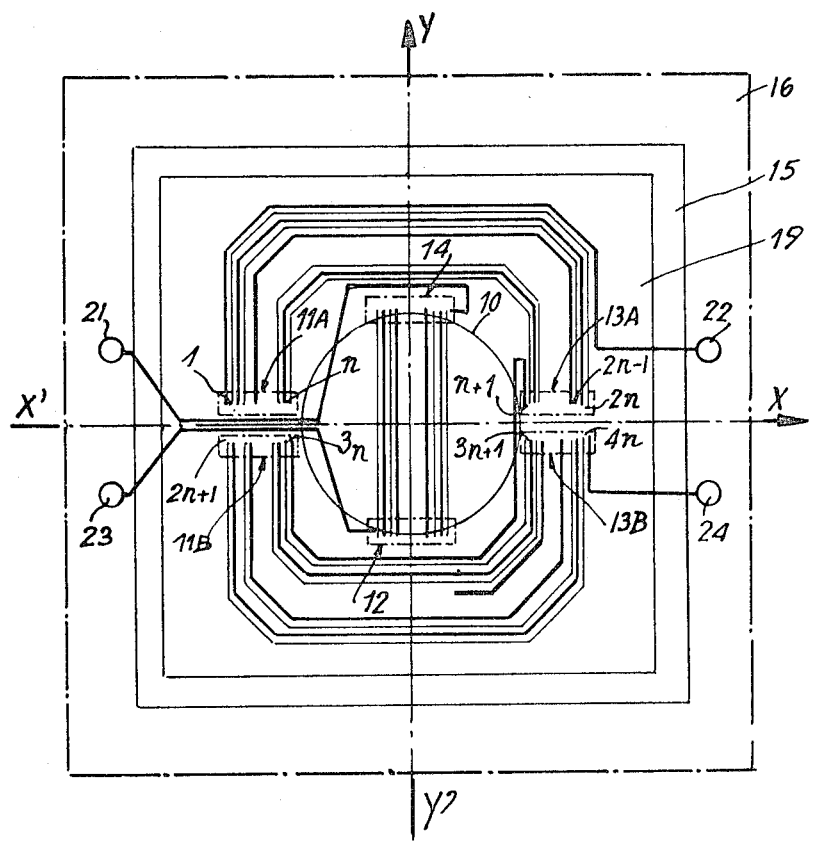
FIG. 3 shows a diagrammatical view in plane of a second embodiment according to the invention.

FIG. 3 shows a combination of these two complementary arrangements, the homologous elements having the same reference numerals as in FIG. 1.

In the arrangement shown, the device comprises areas of thermoelements receiving the rays that are four in number 11A, 11B and 13A, 13B intended to evaluate the displacement of the image 10 along the axis X'OX, and two areas 12, 14 intended to evaluate this displacement along the axis Y'OY. As in the preceding case, these areas are of rectangular shape, but in the present embodiment, they all have their large axis parallel to the axis X'OX and their small axis parallel to the axis Y'OY.

The areas 12 and 14 are so arranged as to be longitudinally tangent to the external edges of the image 10 to be followed, supposedly centered on the origin 0 and their junctions are evenly distributed and connected in series in such manner that a thermoelement has its first junction in an area, 12, for instance, and its second junction in the other area, 14, for instance. One thus sees that their connections are appreciably shortened. The junctions of one and the same area are preferably aligned in a direction parallel to the axis X'OX or else arranged tangently to the edge of the image 10.

Reference numbers 21 and 23 designate the output terminals of the thermopile thus constituted.

According to this arrangement, the electromotive force of each thermopile varies with the displacement of the image in relation to the origin because of the slight heat conductivity of the absorbent coating covering the area and speedily reaches a limit value.

The areas 11A, 11B, and 13A, 13B are placed symmetrically in relation to the origin 0 and in relation to the axes X'OX and Y'OY in two groups which correspond two by two. The areas are arranged so as to be transversally tangent to the external edges of the image 10 supposedly centered on the origin 0. Each thermoelement has its first junction in an area, 11A, for instance, and its second junction in the symmetrical area in relation to the axis Y'OY, 13A, for instance; these thermoelements are also branched in series and follow one another in the following manner, with the numeration adopted in FIG. 3;

| Junction No. | Area |
|---|---|
| 1 | 11A |
| 2n | 13A |
| 2 | 11A |
| 2n−1 | 13A |
| ... | ... |
| ... | ... |
| n | 11A |
| n+1 | 11A |
| 3n | 11B |
| 3n+1 | 13B |
| 3n−1 | 11B |
| ... | |

|         |     |
|---------|-----|
| ...     | ... |
| 2n+1    | 11B |
| 4n      | 13B |

The junctions can be arranged inside an area so as to be aligned, or distributed along several parallel axes.

Reference numbers 22 and 24 are the output terminals of the thermopile thus formed.

One sees that the combination of the two complementary arrangements of the areas 11A, 11B and 13A, 13B on the one hand, and 12, 14 on the other, have the advantage of limiting the space required by the connections joining the various junctions of thermoelements. Another advantage resulting from the arrangement of the areas such as 11 and 13, consists in an increase of the sensitiveness of the device for one and the same displacement of the image from a group of three parallel areas, the electromotive force collected always remaining linear.

The invention is naturally not restricted to the methods that have now been described by way of examples. The two thermopiles can be respectively effected on two different substratums arranged parallel to one another.

So that radiation can reach the two areas situated on the rear substratum, an arrangement is made for openings in the front substratum facing these two areas.

In a case where it is desired to measure displacement in spherical coordinates, it is also possible to arrange the receiving areas on one or two spherical-shaped substratums, or more generally, of simple irregular shape.

I claim:

1. A device for measuring the displacement of the image of an object emitting infrared rays in relation to a point of origin taken on the optical axis of the device, said device comprising a plurality of thermoelectric elements arranged in two groups constituting a thermopile the thermoelectric elements in said groups being respectively aligned and arranged symmetrically along an axis containing said point of origin, the thermoelectric elements of one group being interconnected in series and alternately with the thermoelectric elements of the other group such that the algebraic sum of the voltages produced by the thermoelectric elements radiated by the image is zero when the center of the image is at the point of origin and equidistant between the two groups and departs from zero in one direction or the other in accordance with an increase in the number of radiated thermoelectric elements of one group or the other dependent upon the sense of the departure of the center of the image along said axis from said point of origin.

2. A device for measuring displacement of an image of an object which comprises two thermopiles, each as defined in claim 1, said thermopiles being arranged along axes mutually intersecting at said point of origin.

3. A device for measuring displacement of an image of an object which comprises two thermopiles, each as defined in claim 1, said thermopiles being arranged along mutually perpendicular axes intersecting at said point of origin.

4. A device for measuring the displacement of an image of an object which comprises three thermopiles, each as defined in claim 1, said thermopiles being rectangular in form and arranged tangentially to the external edges of the image of the object centered at the point of origin, one of said thermopiles being arranged tangentially along its largest dimension and two of said thermopiles being arranged tangentially along their smallest dimension.

5. A device as claimed in claim 1 wherein the plurality of the thermoelectric elements of the groups comprise junctions, alternately hot and cold, the junctions of the groups being respectively numbered $1, 2, 3...k...n$ and $n+1, n+2...n+k...2n$, the series interconnections being as follows:

1 to input of the device
2 to $n+1$
3 to $n+2$
4 to $n+3$
.
.
.
$k$ to $n+k-1$
.
.
.
$n$ to $2n-1$
.
.
.
$2n$ to output of the device.

6. A device as claimed in claim 1 wherein the groups of thermoelectric elements are rectangular in form and are arranged tangentially to the external edges of the image of the object centered at the point of origin.

7. A device as claimed in claim 1 and further comprising a coating covering the thermoelectric elements of a group, said coating being an infrared absorbent material to from an area for said group.

8. A device as claimed in claim 1 and further comprising a coating for the thermoelectric element, said coating being an infrared absorbent material whereby discontinuous areas are formed.

9. A device as claimed in claim 1 and further comprising a flat substratum on which the thermoelectric element is deposited.

10. A device as claimed in claim 2 wherein the thermoelectric elements of the groups of each thermopile comprise junctions, alternately hot and cold, each group comprising $n$ junctions respectively numbered $1,2,3...n$ and $n+1, n+2...2n-1, 2n$ and $2n+1, 2n+2...3n-1, 3n$ and $3n+1, 3n+2...4n-1, 4n$, the series interconnections being as follows:

| 1 to input     | $3n-1$ to $3n+1$ |
| 2 to $2n$      | $3n-2$ to $3n+2$ |
| 3 to $2n-1$    | $3n-3$ to $3n+3$ |
| .              | .                |
| $n-1$ to $n+3$ | $2n+1$ to $4n-1$ |
| $n$ to $n+2$   | $4n$ to output.  |
| $n+1$ to $3n$  |                  |

11. A device as claimed in claim 2 and further comprising a spherical substratum on which each thermoelectric element is deposited.

12. A device as claimed in claim 6 wherein the largest dimension of the rectangular form of the groups is arranged tangentially.

13. A device as claimed in claim 6 wherein the smallest dimension of the rectangular form of the groups is arranged tangentially.

* * * * *